(12) United States Patent
Dickson

(10) Patent No.: US 10,361,439 B2
(45) Date of Patent: Jul. 23, 2019

(54) FUEL CELL HAVING A PROJECTING BIPOLAR PLATE

(71) Applicants: VOLKSWAGEN AG, Wolfsburg (DE); AUDI AG, Ingolstadt (DE)

(72) Inventor: Brian Dickson, Burnaby (CA)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 0 days.

(21) Appl. No.: 15/541,346

(22) PCT Filed: Dec. 15, 2015

(86) PCT No.: PCT/EP2015/079682
§ 371 (c)(1),
(2) Date: Jun. 30, 2017

(87) PCT Pub. No.: WO2016/110376
PCT Pub. Date: Jul. 14, 2016

(65) Prior Publication Data
US 2018/0019481 A1    Jan. 18, 2018

(30) Foreign Application Priority Data
Jan. 5, 2015 (DE) .................. 10 2015 200 028

(51) Int. Cl.
| H01M 8/247 | (2016.01) |
|---|---|
| H01M 8/0247 | (2016.01) |
| H01M 8/24 | (2016.01) |
| H01M 8/242 | (2016.01) |
| H01M 8/2483 | (2016.01) |
| H01M 8/2418 | (2016.01) |

(52) U.S. Cl.
CPC .......... *H01M 8/0247* (2013.01); *H01M 8/24* (2013.01); *H01M 8/242* (2013.01); *H01M 8/247* (2013.01); *H01M 8/2418* (2016.02); *H01M 8/2483* (2016.02); *H01M 2250/20* (2013.01); *Y02P 70/56* (2015.11); *Y02T 90/32* (2013.01)

(58) Field of Classification Search
None
See application file for complete search history.

(56) References Cited

U.S. PATENT DOCUMENTS

| 6,066,409 A * | 5/2000 | Ronne ............. H01M 8/0271 429/434 |
| 6,793,544 B2 | 9/2004 | Brady et al. |
| 2009/0004522 A1* | 1/2009 | Rock ............. H01M 8/0258 429/508 |

FOREIGN PATENT DOCUMENTS

| CN | 1024739391 A | 5/2012 |
| DE | 20 2005 008 749 U1 | 10/2006 |
| DE | 10 2007 042 985 A1 | 3/2009 |
| DE | 10 2010 056 014 A1 | 6/2012 |

(Continued)

*Primary Examiner* — Lucas J. O'Donnell
(74) *Attorney, Agent, or Firm* — Seed IP Law Group LLP

(57) ABSTRACT

The invention relates to a fuel cell (1), a fuel cell stack (10) having at least two fuel cells (1), a fuel cell device having a fuel cell stack and a motor vehicle having a fuel cell device. In order to prevent a production-related mispositioning of a membrane electrode assembly (13) of the fuel cell (1) from causing obstructions in the operating media flow, it is provided according to the invention that at least one of the bipolar plates (2, 3) projects farther into an operating media line (4) than the other of the bipolar plates (2, 3).

14 Claims, 3 Drawing Sheets

(56) References Cited

FOREIGN PATENT DOCUMENTS

Figure 1:
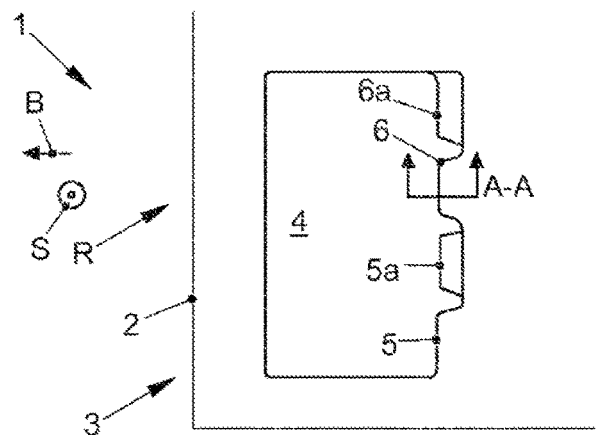

| | | |
|---|---|---|
| DE | 10 2012 020 947 A1 | 4/2014 |
| DE | 11 2004 000 171 B4 | 5/2014 |
| WO | 2009/033648 A1 | 3/2009 |
| WO | 2014/063847 A1 | 5/2014 |

* cited by examiner

FUEL CELL HAVING A PROJECTING BIPOLAR PLATE

The invention relates to a fuel cell having two bipolar plates arranged consecutively in a stack direction of the fuel cell through which the at least one operating media line extends in the stack direction, having a membrane electrode assembly and having an insulation element to electrically insulate the bipolar plates from one another, wherein the insulation element is arranged transversely to the stack direction between the operating media line and the membrane electrode assembly. The invention also relates to a fuel cell stack for a fuel cell device having at least two fuel cells arranged consecutively in a stack direction, wherein an intermediate space is provided between the fuel cells that opens into the operating media line. Additionally, the invention relates to a fuel cell device having a fuel cell stack. Further, the invention relates to a motor vehicle having a fuel cell device that provides driving energy for the motor vehicle.

Fuel cells, fuel cell stacks, fuel cell devices and motor vehicles of the aforementioned type are generally known.

Fuel cells use the chemical conversion of a fuel with oxygen in order to generate electrical energy. To accomplish this, fuel cells contain as core components membrane/electrode assemblies, which can be respectively formed as a combination of an ion-conducting, in particular proton-conducting membrane and an electrode (anode and cathode) on each side of the membrane. In addition, gas diffusion layers can be arranged on both sides of the membrane-electrode arrangement on the sides of the electrodes facing away from the membrane. Fuel cell devices generally comprise a plurality of fuel cells arranged in a stack the electrical outputs of which are cumulative. During operation of the fuel cell, the fuel, in particular hydrogen $H_2$ or a gas mixture containing hydrogen, is guided to the anode where an electrochemical oxidation of $H_2$ to $H^+$ with loss of electrons takes place. Via an electrolyte or the membrane, which separates the reaction chambers gas-tightly from one another and electrically insulates them, the protons $H^+$ are transported from the anode chamber into the cathode chamber in a water-bound or water-free manner. The electrons provided at the anode are guided to the cathode via an electrical line. The cathode is supplied with oxygen or a gas mixture containing oxygen, so that a reduction of $O_2$ to $O^{2-}$ with gain of electrons takes place. At the same time, those oxygen anions react in the cathode chamber with the protons transported via the membrane while forming water. As a result of the direct conversion of chemical into electrical energy, fuel cells have improved efficiency compared to other electricity generators because the Carnot factor is avoided.

The fuel cell device is thus formed by a plurality of individual cells arranged in a stack or from individual cells, so that it is also referred to as a fuel cell stack. The bipolar plates can also provide an electrically conductive contact to the membrane electrode assemblies.

In mounting the fuel cells, it can happen that, because of tolerances, the membrane electrode assembly is arranged outside its target position between the bipolar plates transverse to the stack direction. The membrane electrode assembly is dimensioned in such a way that the fuel cells also function when the membrane electrode assembly is arranged in an offset manner. However, the incorrectly positioned membrane electrode assembly can displace the insulation element towards the operating media line so that the insulation element protrudes into the operating media line. Because of gravity and the elastic properties of the insulation element, the displaced insulation element may deform and at least partially cover the outlet of the intermediate space into the operating media line. One of the operating media required for operation of the fuel cell must be guided through the intermediate space, however. If the insulation element thus covers the outlet of the intermediate space, it then blocks the flow of operating media between the intermediate space and the operating media line so that the fuel cell can no longer be properly operated.

The object of the present invention is to provide a fuel cell, a fuel cell stack, a fuel cell device and a motor vehicle of the aforementioned type, wherein the fuel cell is easy to mount and, in particular, the membrane electrode assembly, having large position tolerances, is easy to position without the possibility of the insulation element covering the outlet of the intermediate space into the operating media line.

For the aforementioned fuel cell, the object is achieved by one of the bipolar plates projecting transversely to the stack direction, at least in some sections, farther into the operating media line than a section of the other of the bipolar plates. For the aforementioned fuel cell stack, the object is achieved by at least one of the fuel cells being a fuel cell according to the invention. The object is achieved for the fuel cell device of the aforementioned type by the fuel cell stack being a fuel cell stack according to the invention. For the aforementioned motor vehicle, the object is achieved by the fuel cell device being a fuel cell device according to the invention.

Because one of the bipolar plates projects transversely to the stack direction, at least in some sections, farther into the operating media line than a section of the other bipolar plates, the one bipolar plate can support the insulation element, so that the insulation element cannot be located in front of the outlet and thereby impede or even block the flow of the operating media. Because the one bipolar plate projects, at least in some sections, beyond the other bipolar plate, the projecting section does not need to be electrically insulated from the other bipolar plate, because it cannot contact the other bipolar plate. If the membrane electrode assembly is thus arranged in its target position, the insulation element does not need to extend out to the projection.

The solution according to the invention may be further improved by various embodiments that are each advantageous per se and, unless stated otherwise, may be combinable with each other in any desired manner. These embodiments and their associated advantages are discussed below.

The section projecting into the operating media line can thus have a protrusion projecting into the operating media line that preferably projects beyond an adjacent section of the other of the bipolar plates. It may specifically suffice that the insulation element is only partially supported, meaning not fully or not over the entire surface, in order to prevent it from resting on the outlet opening. This can save material for the formation of the reserve support surface, so that an unnecessarily high fuel cell weight can be avoided.

Both bipolar plates can each have a protrusion projecting into the operating media line, wherein the projections are spaced apart from one another transverse to the stack direction. A fuel cell designed in such a manner can support the insulation element independently of the direction of the fuel cell in the space in the direction of and counter to the stack direction and thus prevent the insulation element from resting on the outlet opening.

For example, a projection of the protrusion of one of the bipolar plates in the stack direction cannot overlap the other bipolar plate. The projection of the protrusion of the one bipolar plate and the other bipolar plate are thus without overlap. If both of the bipolar plates have projections, projections along the stack direction are preferably also without overlap, so that these projections do not overlap in the stack direction.

The section that projects into the operating media line can be an edge of the one of the two fuel cells that points away from the center of the fuel cell and contacts the operating media line, wherein the edge projects from an edge of the other of the two fuel cells that points away from the center of the fuel cell and contacts the operating media line. For example, the edges point towards one edge region of the fuel cell. The insulation element, in particular, can thus be supported in the event that the insulation element is displaced in the direction of the operating media line by the membrane electrode assembly away from the center and, for example, towards the edge region of the fuel cell.

If at least two fuel cells are combined into a fuel cell stack, the section of one of the fuel cells that protrudes into the operating media line adjoins the intermediate space existing between the fuel cells. The reserve support surface can thus be provided in a space-saving manner and the insulation element can be prevented from resting on the outlet opening.

The section that projects into the operating media line can thus form a reserve support surface for the insulation element.

Figure 2:
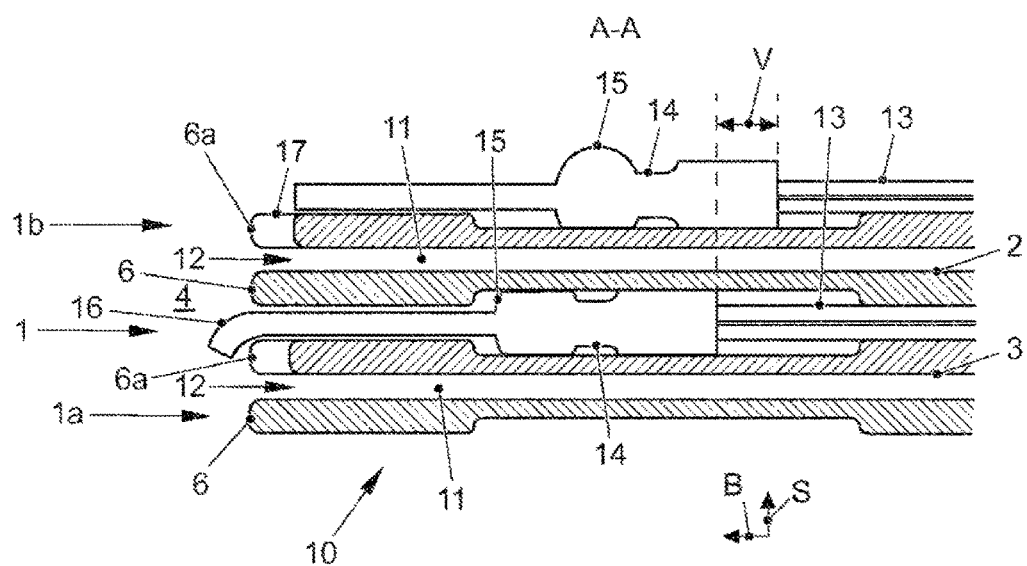
Figure 3:
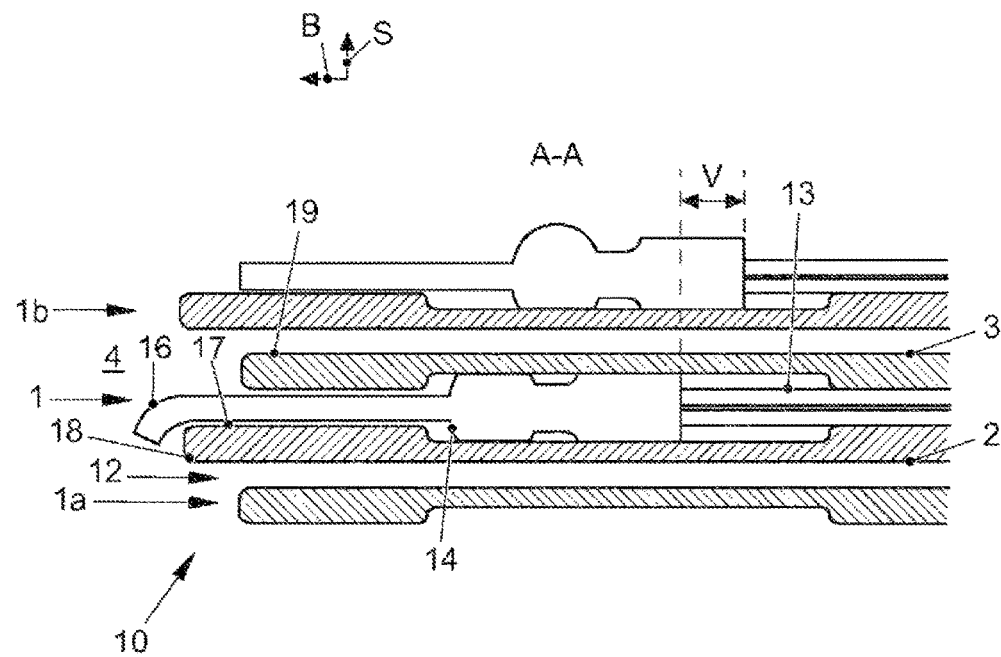
Figure 4:
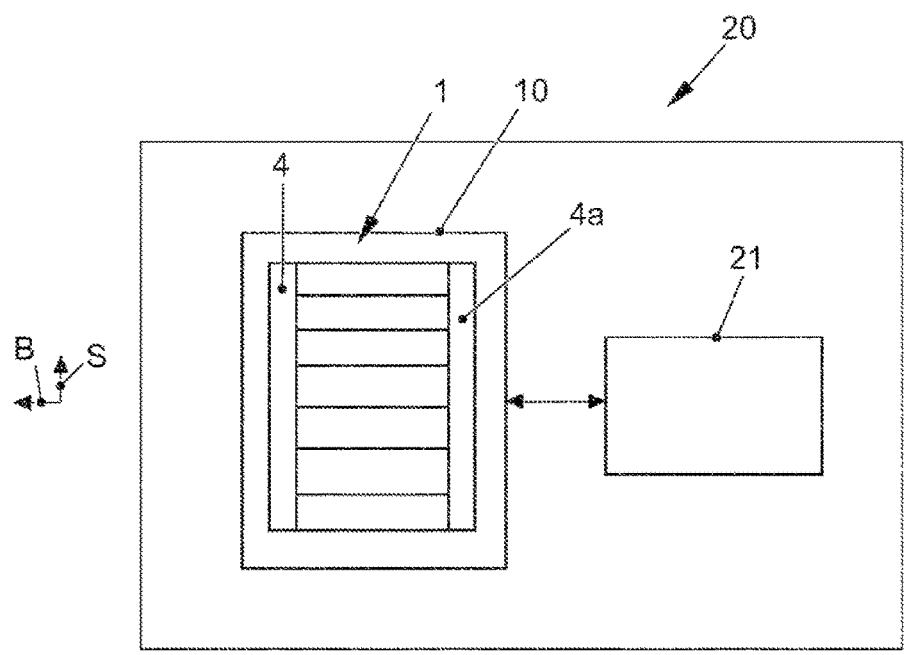
Figure 5:
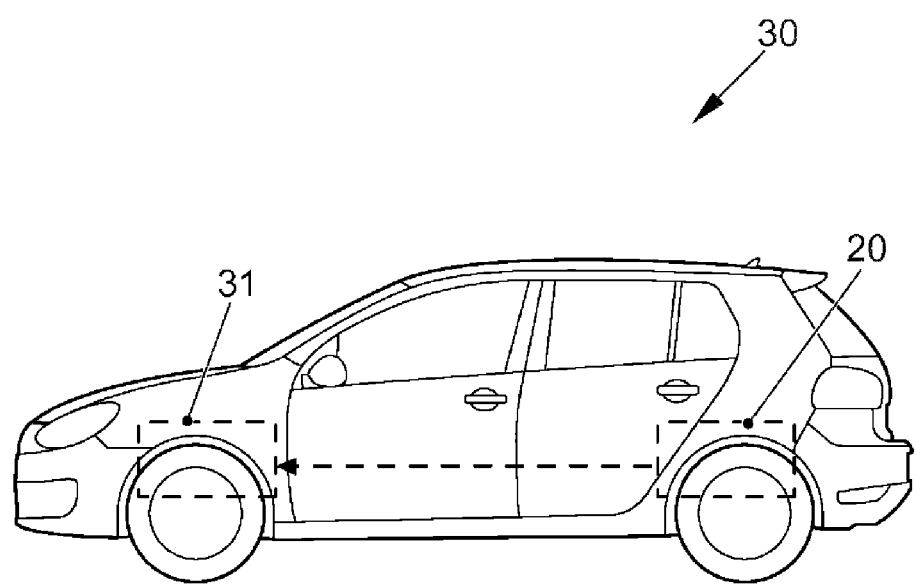

The invention is explained below in exemplary embodiments on the basis of the respective drawings. The following is shown:

FIG. 1 a schematic illustration of an exemplary embodiment of the fuel cell according to the invention in a plan view, FIGS. 2 and 3 schematic illustrations of exemplary embodiments of the fuel cell stack according to the invention in sectional views, FIG. 4 a schematic illustration of an exemplary embodiment of the fuel cell device according to the invention in sectional views, FIG. 5 a schematic illustration of an exemplary embodiment of a motor vehicle according to the invention.

The invention is hereinafter explained using exemplary embodiments in reference to the drawings. The different features of the embodiments can be combined independently of each other, as was already outlined in individual advantageous embodiments.

First, the structure and function of a fuel cell according to the invention are described with reference to the exemplary embodiment in FIG. 1.

FIG. 1 shows the fuel cell 1 having two bipolar plates 2, 3 that are arranged consecutively in a stack direction S and thus stacked. An operating media line 4 extends through bipolar plates 2, 3 along stack direction S. In order to form operating media line 4, bipolar plates 2, 3 have openings that are arranged consecutively and preferably at least essentially in alignment with each other.

Bipolar plate 2 projects, at least in some sections, farther into operating media line 4 than sections of the other bipolar plate 3. In particular, bipolar plate 2 has at least one projection 5 and, for example, two projections 5, 6 that project from the other bipolar plate 3 transversely to stack direction S and, for example, in a width direction B of fuel cell 1, and project into operating media line 4. Width direction B preferably points to an edge region R of fuel cell 1 in the vicinity of which operating media line 4 is arranged. If bipolar plate 2 has two projections 5, 6, they can be provided at a distance from each other, in particular perpendicular to stack direction S and to width direction B.

In particular, one of the bipolar plates 2 can protrude in the direction of an edge region R of fuel cell 1, at least in some sections, from the other of the bipolar plates 3, so that, for example, projections 5, 6 extend in a direction towards edge region R. Operating media line 4 preferably extends between projections 5, 6 and edge region R.

Also the other of the bipolar plates 3 can have at least one projection 5a and, for example, two projections 5a, 6a that project into operating media line 4 with respect to sections of one of the two bipolar plates 2, for example in a direction towards edge region R. In order to prevent projections 5, 5a, 6, 6a from mechanically contacting each other, thus possibly creating an electrical short circuit between bipolar plates 2, 3, projections 5, 6 of bipolar plate 2 are arranged transversely to stack direction S and, for example, spaced apart from projections 5a, 6a of bipolar plate 3. Protrusions of projections 5, 6 consequently do not overlap with projections 5a, 6a in stack direction S, but rather extend at a distance from projections 5a, 6a.

FIG. 2 shows a fuel cell stack 10 schematically in a side section view, wherein the section view corresponds to a section indicated in FIG. 1 by the designation A-A. For elements that correspond in function or structure to elements of the exemplary embodiment in FIG. 1, the same reference characters are used. For brevity's sake, only the differences from the exemplary embodiment in FIG. 1 are addressed below.

Fuel cell stack 10 has fuel cell 1 of the exemplary embodiment in FIG. 1. FIG. 2 also shows two additional fuel cells 1a, 1b, wherein fuel cells 1, 1a, 1b are consecutively arranged in stack direction S and are shown summarized as fuel cell stack 10. An intermediate space 11 is provided between fuel cells 1 and 1a as well as fuel cells 1 and 1b. The intermediate spaces 11 each have an outlet opening 12 through which the operating medium from operating media line 4 can flow into the respective intermediate space 11.

Each of fuel cells 1, 1a, 1b has a membrane electrode assembly 13 that is arranged between bipolar plates 2, 3 of respective fuel cells 1, 1a, 1b. Each of fuel cells 1, 1a, 1b also has an insulating element 14 that electrically separates bipolar plates 2, 3 of each of fuel cells 1, 1a, 1b from each other, so that bipolar plates 2, 3 are not connected to one another via an electrical short circuit. Insulation element 14 is arranged between membrane electrode assembly 13 and operating media line 4 transversely to stack direction S and, for example, in width direction B. In its course transverse to stack direction S, for example in width direction B of fuel cell stack 10, insulation element 14 can have a thickening 15 that, as a sealing element, prevents a flow through respective fuel cells 1, 1a, 1b transversely to stack direction S.

Membrane electrode assembly 13 of fuel cell 1b is arranged transverse to stack direction S and in its target position at least in width direction B. Insulation element 14 of fuel cell 13, however, does not project into operating media line 4.

Membrane electrode assembly 13 of fuel cell 1, however, is arranged transverse to stack direction S and, for example, displaced by an offset V in width direction B with respect membrane electrode assembly 13 of fuel cell 1b. Insulation element 14 of fuel cell 1 is therefore displaced towards operating media line 4, so that, in particular, a free end 16 of insulation element 14 projects into operating media line 4. For example, because of gravity or due to an operating medium flowing around free end 16, the free end 16 projecting into operating medium line 4 can deform and thus cover outlet opening 12, which is between fuel cells 1 and 1b, so that no operating medium can flow between operating media line 4 and intermediate space 11 provided between fuel cells 1 and 1a. The operation of at least fuel cell 1 and possibly also fuel cell 1a would thus be limited or wholly impossible because operating medium could no longer flow into intermediate space 11 or out of it during operation. Projection 6a, however, forms a reserve support surface 17 for insulation element 14, so that it can be supported by projection 6a and, consequently, no longer cover outlet opening 12.

FIG. 3 shows an additional exemplary embodiment of fuel cell stack 10 according to the invention having differently configured fuel cells 1, 1a, 1b. For elements that correspond in function and/or structure to elements of the exemplary embodiment in FIGS. 1 and 2, the same reference characters are used. For brevity's sake, only the differences from the exemplary embodiment in FIGS. 1 and 2 are addressed below.

In FIG. 3, fuel cell stack 10 is also shown in section as indicated in FIG. 1 by section A-A. Bipolar plates 2, 3, at least of fuel cell 1, however, have no projections 5, 6 or 5a, 6a. Instead, an edge 18 adjacent to operating media line 4 projects over an edge 19 adjacent to operating media line 4 of bipolar plate 2 transversely to stack direction S and, for example, in width direction B.

Projecting edge 18 also forms reserve support surface 17 for free end 16 of insulation element 14, so that this does not cover, and thus does not at least partially close, outlet opening 12 between fuel cells 1 and 1a, even if there is an offset V of membrane electrode assembly 13.

FIG. 4 shows a first exemplary embodiment of a fuel cell device according to the invention in a schematic view. For elements that correspond in function and/or structure to elements of the exemplary embodiment in the preceding figures, the same reference characters are used. For brevity's sake, only the differences from the previous exemplary embodiments are addressed below.

Fuel cell device 20 has fuel cell stack 10 of one of the previous exemplary embodiments having a plurality of fuel cells 1. In addition to operating media line 4, an additional operating media line 4a extends through fuel cell stack 10, wherein operating media lines 4, 4a are mutually arranged on opposing sides of bipolar plates 2, 3 transverse to stack direction S and, for example, in width direction B.

Fuel stack 10 according to the invention as well as fuel cells 1, 1a, 1b according to the invention can have at least two and, for example, at least four operating media lines 4. At least two of operating media lines 4 can be connected to one another by selected intermediate spaces 11 in an operating-medium-conductive manner and form an operating medium path that is fanned out between operating media lines 4 in the region of intermediate spaces 11. Membrane electrode assemblies 13 are preferably arranged between the operating media lines 4 of one of the operating media paths.

Both sides of bipolar plates 2, 3 that adjoin operating media lines 4, 4a can be formed according to the invention having projecting or protruding sections projecting into the operating media line, for example projections 5, 5a, 6, 6a.

Additionally, the fuel cell device can have a control device 21 that can be connected to fuel cell stack 10 so as to transmit control signals.

FIG. 5 shows a first exemplary embodiment of a motor vehicle according to the invention having a fuel cell device 20.

Motor vehicle 30 has a drive mechanism 31, for example an electric motor, which is connected to fuel cell device 20 so as to transmit drive energy. In operation, fuel cell device 20 creates drive energy that is directed to drive mechanism 31, whereby motor vehicle 30 can be operated using electric fuel cell energy.

REFERENCE LIST 1, 1a, 1b fuel cell
2, 3 bipolar plate
4, 4a operating media line
5, 5a, 6, 6a projection
10 fuel cell stack
11 intermediate space
12 outlet opening
13 membrane electrode system
14 insulation element
15 thickening
16 free end of the insulation element
17 reserve support surface
18 edge of bipolar plate 3 adjacent to the operating media line
19 edge of bipolar plate 2 adjacent to the operating media line
20 fuel cell device
21 control unit
30 motor vehicle
31 drive mechanism
B width direction
S stack direction
R edge region
V offset

The invention claimed is:

1. A fuel cell, comprising:
a first bipolar plate arranged in a stack direction, the first bipolar plate including a plurality of first sections that are spaced apart from each other transverse to the stack direction to define first spaces;
a second bipolar plate arranged in the stack direction, the second bipolar plate including a plurality of second sections that are spaced apart from each other transverse to the stack direction to define second spaces;
at least one operating media line that extends through the two bipolar plates in the stack direction;
a membrane electrode assembly arranged between the two bipolar plates in the stack direction; and
an insulating element that, in operation, electrically insulates the two bipolar plates from one another, the insulating element being arranged between the two bipolar plates in the stack direction and, transversely to the stack direction, between the operating media line and the membrane electrode assembly, wherein:
the first sections and the second sections are arranged to include:
at least some first sections of the first bipolar plate that protrude into the operating media line further than the second sections of the second bipolar plate through the second spaces; and
at least some second sections of the second bipolar plate that protrude into the operating media line further than the first sections of the first bipolar plate through the first spaces; and
at least one first section of the first bipolar plate that projects into the operating media line includes a reserve support surface which is sized and shaped to support a section of the insulating element that protrudes into the operating media line.

2. The fuel cell according to claim 1 wherein the first sections of the first bipolar plate projecting into the operating media line are protrusions projecting into the operating media line that project beyond the second sections of the second bipolar plate transversely to the stack direction.

3. The fuel cell according to claim 1 wherein the first sections of the first bipolar plate projecting into the operating media line are edges that point toward an edge region of the fuel cell, and contact the operating media line.

4. A fuel cell stack for a fuel cell device, the fuel cell stack comprising:
- at least two fuel cells arranged consecutively in a stack direction, at least one of the at least two fuel cells including:
  - a first bipolar plate arranged in a stack direction, the first bipolar plate including a plurality of first sections that are spaced apart from each other transverse to the stack direction to define first spaces;
  - a second bipolar plate arranged in the stack direction, the second bipolar plate including a plurality of second sections that are spaced apart from each other transverse to the stack direction to define second spaces;
  - at least one operating media line that extends through the two bipolar plates in the stack direction;
  - a membrane electrode assembly arranged between the two bipolar plates in the stack direction;
  - an intermediate space between the at least two fuel cells that opens into the operating media line; and
  - an insulating element that, in operation, electrically insulates the two bipolar plates from one another, the insulating element being arranged between the two bipolar plates in the stack direction and, transversely to the stack direction, between the operating media line and the membrane electrode assembly, wherein:
    - the first sections and the second sections are arranged to include:
      - at least some first sections of the first bipolar plate that protrude into the operating media line further than the second sections of the second bipolar plate through the second spaces; and
      - at least some second sections of the second bipolar plate that protrude into the operating media line further than the first sections of the first bipolar plate through the first spaces; and
      - at least one first section of the first bipolar plate that projects into the operating media line includes a reserve support surface which is sized and shaped to support a section of the insulating element that protrudes into the operating media line.

5. The fuel cell stack according to claim 4 wherein the first sections of the first bipolar plate projecting into the operating media line adjoin the intermediate space.

6. A fuel cell device comprising a fuel cell stack including:
- at least two fuel cells arranged consecutively in a stack direction, at least one of the at least two fuel cells including:
  - a first bipolar plate arranged in a stack direction, the first bipolar plate including a plurality of first sections that are spaced apart from each other transverse to the stack direction to define first spaces;
  - a second bipolar plate arranged in the stack direction, the second bipolar plate including a plurality of second sections that are spaced apart from each other transverse to the stack direction to define second spaces;
  - at least one operating media line that extends through the two bipolar plates in the stack direction;
  - a membrane electrode assembly arranged between the two bipolar plates in the stack direction;
  - an intermediate space between the at least two fuel cells that opens into the operating media line; and
  - an insulating element that, in operation, electrically insulates the two bipolar plates from one another, the insulating element being arranged between the two bipolar plates in the stack direction and, transversely to the stack direction, between the operating media line and the membrane electrode assembly, wherein:
    - the first sections and the second sections are arranged to include:
      - at least some first sections of the first bipolar plate that protrude into the operating media line further than the second sections of the second bipolar plate through the second spaces; and
      - at least some second sections of the second bipolar plate that protrude into the operating media line further than the first sections of the first bipolar plate through the first spaces; and
      - at least one first section of the first bipolar plate that projects into the operating media line includes a reserve support surface which is sized and shaped to support a section of the insulating element that protrudes into the operating media line.

7. A motor vehicle comprising a fuel cell device that provides driving power for the motor vehicle, the fuel cell device including a fuel cell stack including:
- at least two fuel cells arranged consecutively in a stack direction, at least one of the at least two fuel cells including:
  - a first bipolar plate arranged in a stack direction, the first bipolar plate including a plurality of first sections that are spaced apart from each other transverse to the stack direction to define first spaces;
  - a second bipolar plate arranged in the stack direction, the second bipolar plate including a plurality of second sections that are spaced apart from each other transverse to the stack direction to define second spaces;
  - at least one operating media line that extends through the two bipolar plates in the stack direction;
  - a membrane electrode assembly arranged between the two bipolar plates in the stack direction;
  - an intermediate space between the at least two fuel cells that opens into the operating media line; and
  - an insulating element that, in operation, electrically insulates the two bipolar plates from one another, the insulating element being arranged between the two bipolar plates in the stack direction and, transversely to the stack direction, between the operating media line and the membrane electrode assembly, wherein:
    - the first sections and the second sections are arranged to include:
      - at least some first sections of the first bipolar plate that protrude into the operating media line further than the second sections of the second bipolar plate through the second spaces; and
      - at least some second sections of the second bipolar plate that protrude into the operating media line further than the first sections of the first bipolar plate through the first spaces; and
      - at least one first section of the first bipolar plate that projects into the operating media line includes a reserve support surface which is sized and shaped to support a section of the insulating element that protrudes into the operating media line.

8. The motor vehicle according to claim 7 wherein the first sections of the first bipolar plate projecting into the operating media line adjoin the intermediate space.

9. The fuel cell stack according to claim 4 wherein the first sections of the first bipolar plate projecting into the operating media line are protrusions projecting into the operating media line.

10. The fuel cell stack according to claim 4 wherein the first sections of the first bipolar plate projecting into the operating media line are edges that point toward an edge region of the fuel cell, and contact the operating media line.

11. The fuel cell device according to claim 6 wherein the first sections of the first bipolar plate projecting into the operating media line adjoin the intermediate space.

12. The fuel cell according to claim 1 wherein the section of the insulating element supported by the reserve support surface is a free end of the insulating element which is positioned away from a region between the first and second bipolar plates in which the insulating element is positioned.

13. A fuel cell, comprising:
a first bipolar plate arranged in a stack direction, the first bipolar plate including a plurality of first protrusions that are spaced apart from each other transverse to the stack direction to define first spaces;
a second bipolar plate arranged in the stack direction, the second bipolar plate including a plurality of second protrusions that are spaced apart from each other transverse to the stack direction to define second spaces;
at least one operating media line that extends through the first and second bipolar plates in the stack direction;
a membrane electrode assembly arranged between the first and second bipolar plates in the stack direction; and
an insulating element that, in operation, electrically insulates the first and second bipolar plates from one another, the insulating element being arranged between the first and second bipolar plates in the stack direction and, transversely to the stack direction, between the operating media line and the membrane electrode assembly, wherein:
the first protrusions and the second protrusions are arranged to include:
at least some first protrusions of the first bipolar plate that protrude into the operating media line further than the second protrusions of the second bipolar plate through the second spaces; and
at least some second protrusions of the second bipolar plate that protrude into the operating media line further than the first protrusions of the first bipolar plate through the first spaces; and
at least one first protrusion of the first bipolar plate that projects into the operating media line includes a reserve support surface, the reserve support surface is sized and shaped to support a section of the insulating element that protrudes into the operating media line.

14. The fuel cell according to claim 13 wherein the section of the insulating element supported by the reserve support surface is a free end of the insulating element which is positioned away from a region between the first and second bipolar plates in which the insulating element is positioned.

* * * * *